(12) United States Patent
Akoum et al.

(10) Patent No.: US 10,826,591 B1
(45) Date of Patent: Nov. 3, 2020

(54) IRREGULAR GRID SUB SAMPLING TO REDUCE FEEDBACK OVERHEAD IN A 5G OR OTHER NEXT GENERATION WIRELESS NETWORK

(71) Applicant: AT&T Intellectual Property I, L.P., Atlanta, GA (US)

(72) Inventors: Salam Akoum, Austin, TX (US); Xiaoyi Wang, Austin, TX (US); Ralf Bendlin, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/561,547

(22) Filed: Sep. 5, 2019

(51) Int. Cl.
| | |
|---|---|
| *H04B 7/06* | (2006.01) |
| *H04L 1/00* | (2006.01) |
| *H04B 17/10* | (2015.01) |
| *H04B 7/0413* | (2017.01) |

(52) U.S. Cl.
CPC ......... *H04B 7/0626* (2013.01); *H04B 7/0413* (2013.01); *H04B 17/102* (2015.01); *H04L 1/0029* (2013.01)

(58) Field of Classification Search
CPC ... H04B 7/0619; H04B 7/0626; H04B 7/0632
See application file for complete search history.

(56) References Cited

U.S. PATENT DOCUMENTS

| | | | |
|---|---|---|---|
| 2016/0080052 A1* | 3/2016 | Li | H04B 7/0456 375/267 |
| 2016/0156401 A1* | 6/2016 | Onggosanusi | H04B 7/0478 370/329 |
| 2017/0019225 A1* | 1/2017 | Kim | H04B 7/063 |
| 2019/0364546 A1* | 11/2019 | Kwak | H04L 1/18 |

\* cited by examiner

*Primary Examiner* — Kevin Kim
(74) *Attorney, Agent, or Firm* — Amin, Turocy & Watson, LLP

(57) ABSTRACT

The technologies described herein are generally directed to facilitating irregular grid subsampling to reduce feedback overhead. According to an embodiment, a system can comprise a processor and a memory that can store executable instructions that, when executed by the processor, facilitate performance of operations. The operations can include communicating, by the transceiver, a reference signal to a device. The operations can further include receiving, by the transceiver, a channel state report from the device that is based on an irregularly subsampled portion of the reference signal, based on a criterion. The operations can further include adjusting a communication parameter of the transceiver, based on the channel state report.

20 Claims, 10 Drawing Sheets

US 10,826,591 B1

IRREGULAR GRID SUB SAMPLING TO REDUCE FEEDBACK OVERHEAD IN A 5G OR OTHER NEXT GENERATION WIRELESS NETWORK

TECHNICAL FIELD

The subject application is related to wireless communication systems, and, for example, to feedback overhead in advanced networks, such as in a fifth generation (5G) network or beyond.

BACKGROUND

With the increase in the use of 5G and other modern networks comes an increase in the need for feedback communications from user equipments (UEs) and other elements of the network. The can be even more important in systems using multiple input multiple output (MIMO) technologies, because these can require even more antennas. Feedback from UEs can be helpful in reducing interference with the use of MIMO antennas.

Problems can occur, however, because, although feedback from UEs can generally improve the operation of advanced network systems, the overhead caused by providing feedback can also be detrimental to these systems.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
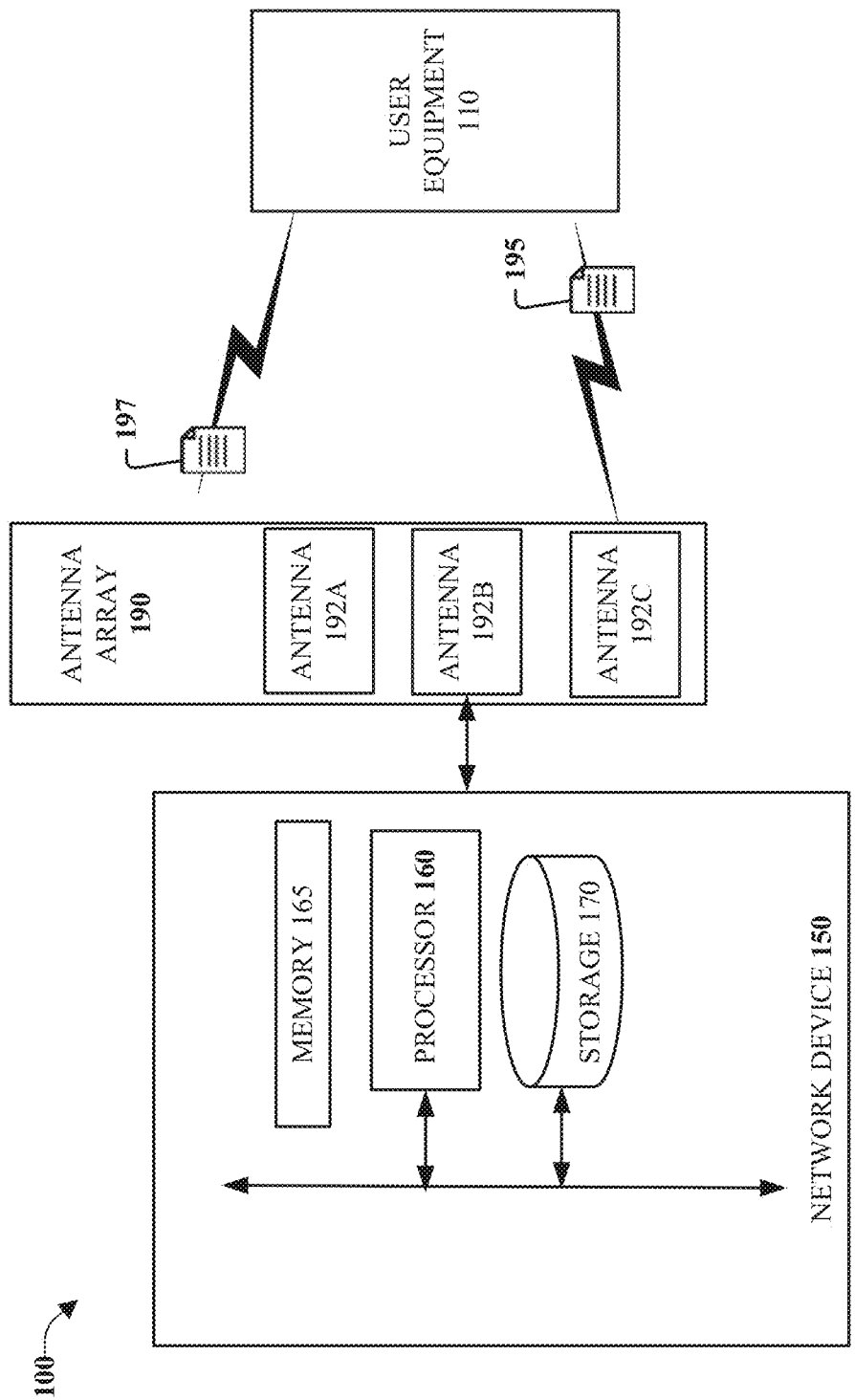
FIG. 1 illustrates a block diagram of an example, non-limiting system that includes a network device communicatively coupled to a user equipment via an antenna array that facilitates multiple wireless connections, in accordance with one or more embodiments.

Generally speaking, one or more embodiments described herein provide mechanisms and signaling to facilitate irregular grid subsampling to reduce feedback overhead, in accordance with one or more embodiments.

It should be understood that any of the examples and terms used herein are non-limiting. For instance, the examples are based on 5G communications between a UE exemplified as a smartphone or the like and network devices; however virtually any communications devices can benefit from the technology described herein, and/or their use in different spectrums can likewise benefit. Thus, any of the embodiments, aspects, concepts, structures, functionalities or examples described herein are non-limiting, and the technology can be used in various ways that provide benefits and advantages in radio communications in general.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize that many modifications can be made to this configuration without departing from the scope or spirit of the various embodiments.

In addition, one or more embodiments described herein can be directed towards a multi-connectivity framework that supports the operation of New Radio (NR, also termed 5G). As will be understood, one or more embodiments can allow an integration of V2X UEs with network assistance, by supporting control and mobility functionality on cellular links (e.g. Long Term Evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology can be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

In some embodiments, the non-limiting term integrated access backhaul (IAB) is used. In Release 16 of the 3rd Generation Partnership Project (3GPP) specification, an IAB framework based on fixed relays is standardized. This Release 16 IAB framework allows for a multi-hop network based on a hierarchical tree architecture. As described further below, in some embodiments, one or more of the non-limiting terms "relay node," "mobile relay node," "anchor node," and "mobile base station" can describe mobile relay nodes supporting a mobile IAB network. It should be appreciated that notwithstanding some descriptions herein referring to concepts of wireless base stations being "fixed," "stationary" or similar terms, and "mobile," "mobile," "nonfixed" or similar terms, these terms describing a capacity for movement are not limiting, e.g., in different embodiments, a mobile base station described herein can be fixed in position, and vice versa.

In some embodiments the non-limiting term UE is used. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UEs 302A-B can also comprise IOT devices that communicate wirelessly.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

Some embodiments are described in particular for 5G NR systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

FIG. 1 illustrates a block diagram of an example, non-limiting system 100 that includes network device 150 communicatively coupled to UE 110 via an antenna array 190 that can include antennas 192A-C, which can facilitate transmission and receipt of multiple wireless signals, in accordance with one or more embodiments. As discussed further below, a non-limiting example of signals that can be transmitted via wireless signals include reference signal 195 and feedback signal (e.g., CSI) 197.

According to multiple embodiments, network device 150 includes memory 165 that can store one or more computer and/or machine readable, writable, and/or executable components and/or instructions that, when executed by processor 160, can facilitate performance of operations defined by the executable component(s) and/or instruction(s). For example, memory 165 can store computer executable components that can, when executed by processor 160, execute the components depicted in FIG. 4 below.

In some embodiments, memory 165 can comprise volatile memory (e.g., random access memory (RAM), static RAM (SRAM), dynamic RAM (DRAM), etc.) and/or non-volatile storage 170 (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more of a central processing unit, a multi-core processor, a microprocessor, dual microprocessors, a microcontroller, a System on a Chip (SOC), an array processor, a vector processor, and/or another type of processor. Further examples of processor 160 are described below with reference to processing unit 1004 of FIG. 10. Such examples of processor 160 can be employed to implement any embodiments of the subject disclosure.

As used in this disclosure, in some embodiments, the terms "component," "system" and the like are intended to refer to, or comprise, a computer-related entity or an entity related to an operational apparatus with one or more specific functionalities, where, for example, the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution, and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments. As noted above, FIG. 4, discussed below, provides examples of computer-executable components that can provide different functions described herein.

It should also be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Figure 2:
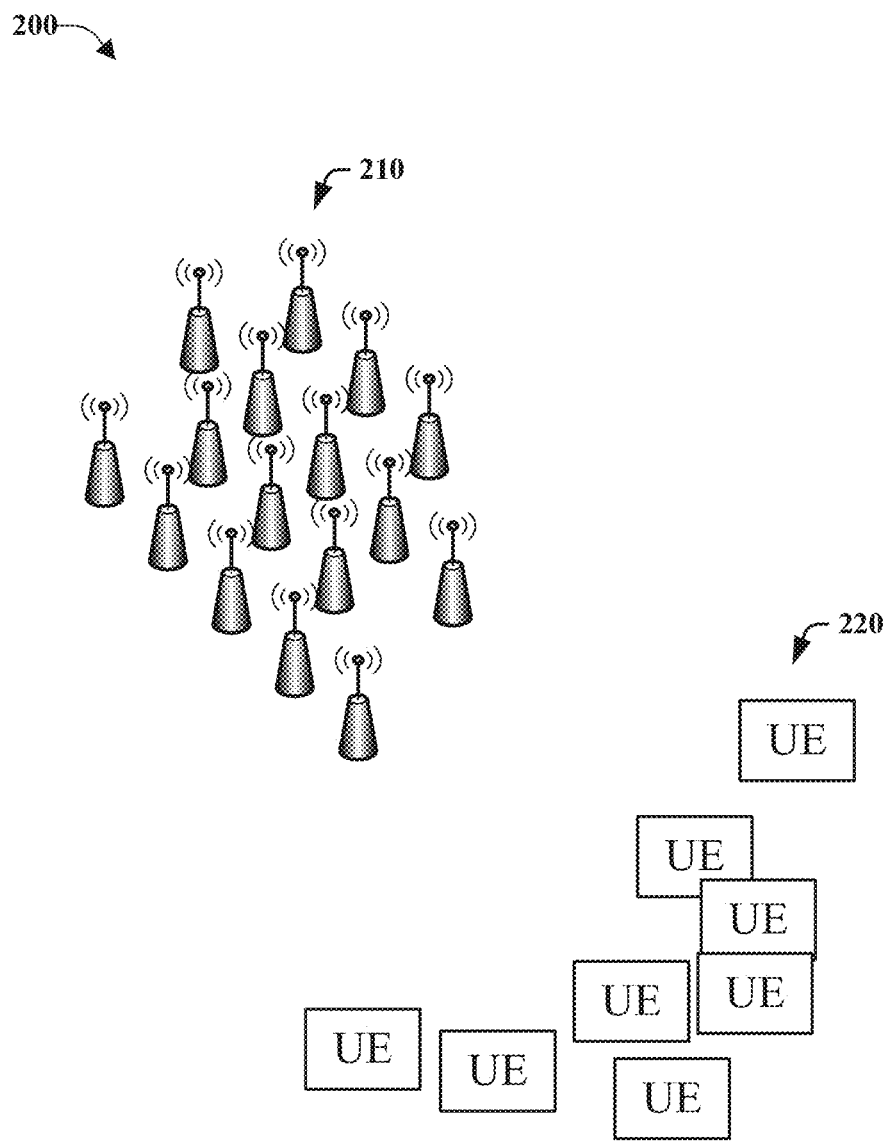
FIG. 2 illustrates an example wireless communication system showing multiple example antennas and multiple UEs, in accordance with one or more embodiments.

FIG. 2 illustrates an example wireless communication system 200 showing multiple example antennas 210 and multiple UEs 220, in accordance with one or more embodiments. For purposes of brevity, description of like elements and/or processes employed in other embodiments is omitted.

In one or more embodiments, in order for a UE to use MIMO, UE 110 generally must identify the number of antennas available, and the channel of each antenna 210 to be used. In some circumstances each antenna can broadcast a specific, known reference signal 195, that can be used by UEs 110 to both identify the antenna and assess channel state information (CSI).

Broadly speaking, one or more embodiments can utilize different subsampling approaches to reduce the overhead associated with feedback communications between nodes in a communications network. One example area where feedback overhead is increasing is with the use of MIMO network technologies. In some implementations, MIMO is a core technology that can help meet the improvements in spectral efficiency envisioned for 5G and other advanced networks. Relevant to this disclosure, massive MIMO systems can involve the use of large number of antennas at the base stations, serving tens of active users. As the number of antennas in a limited area increases, the likelihood of signal interference increases. Accurate channel state information (CSI) can, in some circumstances, reduce this interference and thus CSI and other type of UE feedback can be important for the operation of massive MIMO systems.

Considering CSI in more detail, in time division duplexing (TDD) systems, where the downlink and uplink can be operated in the same spectrum, CSI can be obtained by invoking channel reciprocity. For FDD systems, where the downlink and uplink occur at different parts of the frequency spectrum, CSI can generally be obtained through limited feedback from a receiver device to a transmitter device. Relevant to this disclosure, obtaining CSI over the air can be costly because of the dimensions of the involved channels in massive MIMO systems, e.g., feedback overhead generally increases with the number of antennas. This subsequently affects the scalability of the reference signal design and can hinder the practicality of massive MIMO technologies.

In cellular networks, such as 5G NR and other advanced networks, the MIMO framework can be designed to operate on all frequency bands, both FDD and TDD. Further, given that FDD bands are still prevalent for operators in general (sub-6 GHz bands), reducing the overhead in massive MIMO FDD systems can be beneficial to the success of massive MIMO in practical communication networks deployments. For FDD systems, relying on feedback from the user device to the base station device can result in a large overhead in the reference signals and the feedback overhead. For full-dimensional (FD-MIMO) systems, a CSI reporting procedure can be based on beamformed reference signals to improve the feedback framework for systems with a larger number of antennas. For example, in one or more embodiments, feedback communications can be used to adjust beamforming parameters to improve characteristics of signals transmitted from the base station device to the user device, e.g., signal strength, signal quality, and other signal characteristics. Further, in 5G NR, in addition to beamformed CSI Reference Signal (CSI-RS), type II CSI can improve the accuracy of the feedback, especially for multi-user MIMO.

Figure 3:
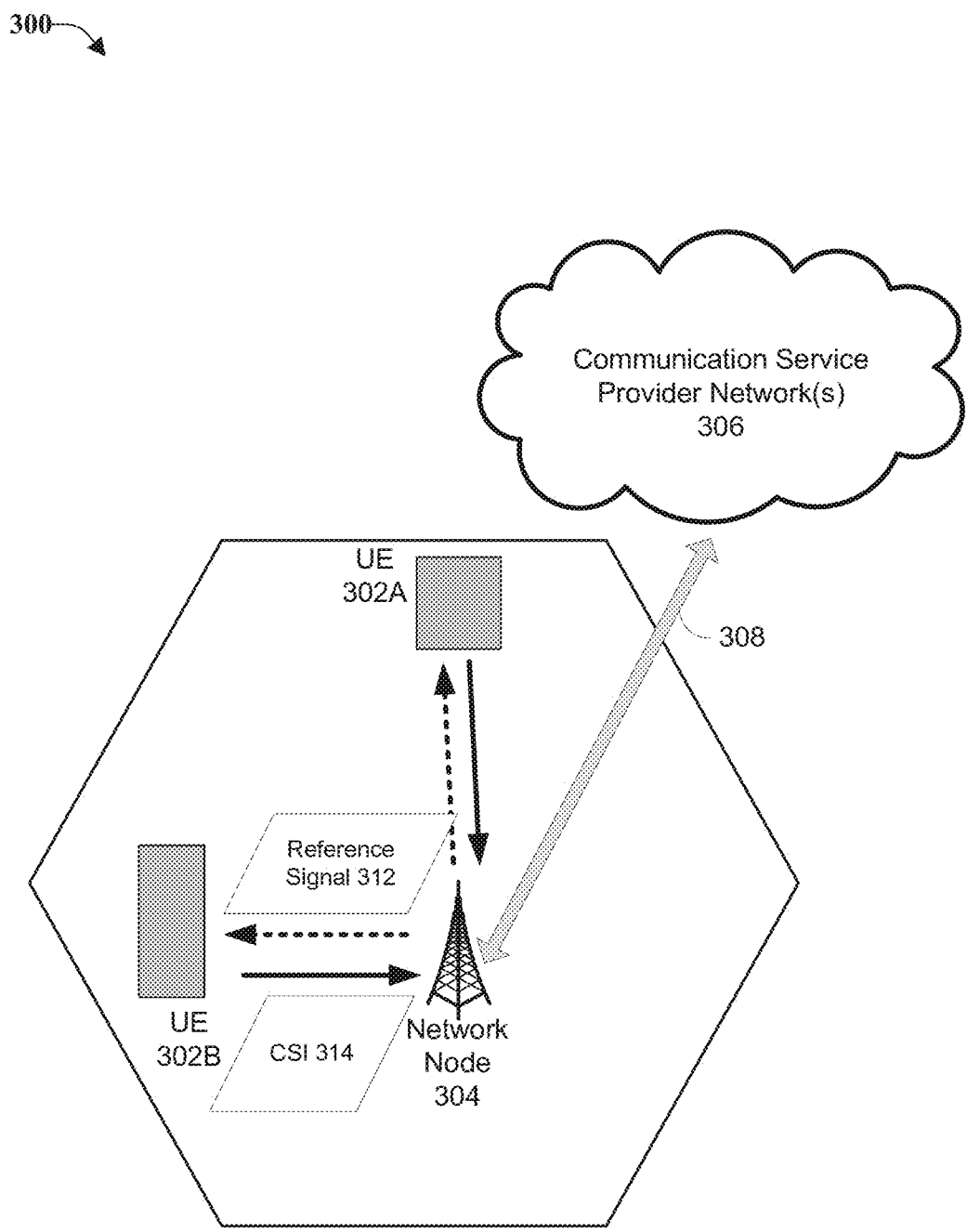
FIG. 3 illustrates a non-limiting example of a wireless communication system, in accordance with various aspects and implementations of the subject disclosure.

FIG. 3 illustrates a non-limiting example of a wireless communication system 300 in accordance with various aspects and embodiments of the subject disclosure. For purposes of brevity, description of like elements and/or processes employed in other embodiments is omitted.

In one or more embodiments, system 300 can comprise one or more mobile devices, such as UEs 302A-B. In various embodiments, system 300 is or comprises a wireless communication network serviced by one or more wireless communication network providers. In example embodiments, UEs 302A-B can be communicatively coupled to the wireless communication network via a network node 304. Network node 304 can communicate with UEs 302A-B, thus providing connectivity between the UEs 302A-B and communication service provider networks 306. UEs 302A-B can send transmission type recommendation data to the network node 304.

Network node 304 can have a cabinet and other protected enclosures, an antenna mast, and multiple antennas for performing various transmission operations (e.g., MIMO operations). Network node 304 can serve several cells, also called sectors, depending on the configuration and types of antennas utilized. Network node 304 can comprise base station devices. In example embodiments, UEs 302A-B can send and/or receive communication data via a wireless link to the network node 304. The dashed arrow lines from the network node 304 to the UEs 302A-B represent downlink (DL) communications and the solid arrow lines from the UEs 302A-B to the network node 304 represents an uplink (UL) communications.

In some embodiments, a UE such as UE 302A can receive reference signals 312 from one or more antennas of network node 304. As described below, UE 302A can perform sampling according to the disclosure herein, and the resulting sample data can be sent from UE 302A to network node 304 via one or more CSI 314 messages. This basic framework may be modified in some embodiments, as will be appreciated.

Figure 4:
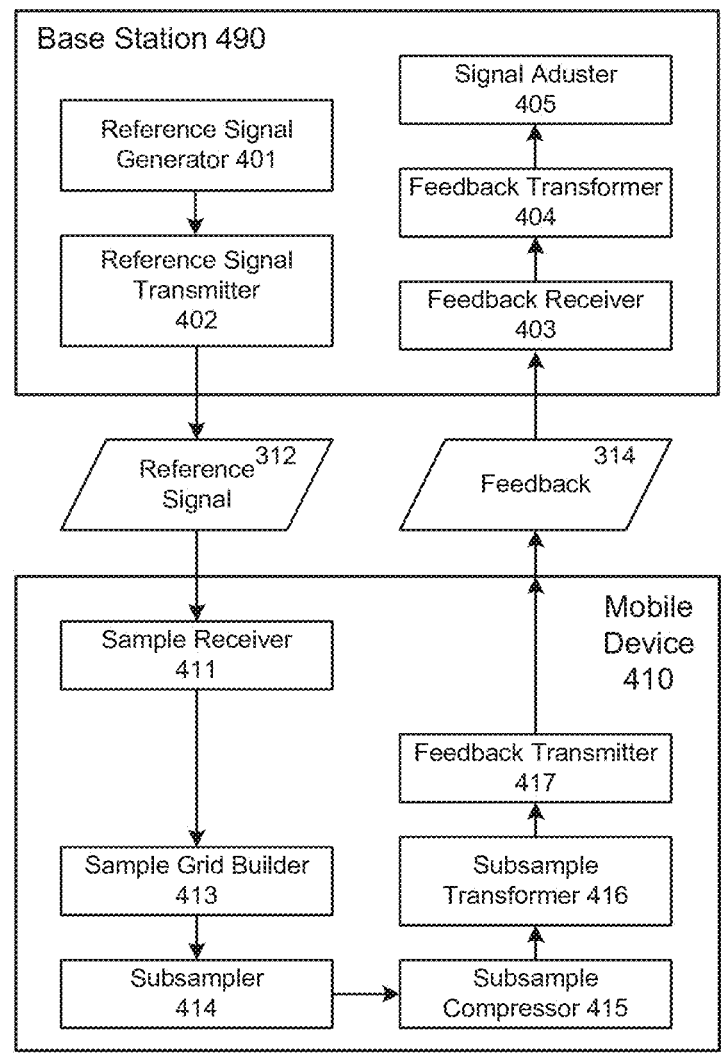
FIG. 4 is a block diagram illustrating example operations and interactions of a base station and a mobile device, in accordance with various aspects and implementations of the subject disclosure.

FIG. 4 is a block diagram 400 illustrating operations at base station 490 and a mobile device 410, as well as interactions between the base station and the mobile device, in accordance with various aspects and implementations of the subject disclosure. Repetitive description of like elements employed in other embodiments described herein is omitted for sake of brevity. FIG. 4 includes base station 490 and mobile device 410, as well as reference signal 312 and feedback 314 exchanged between the base station 490 and the mobile device 410.

It should further be appreciated that, although several examples discussed herein relate to specific feedback signals (e.g., CSI-RS signals), the approaches discussed herein can apply to the transformation and combination of different types of wired and wireless signals that can provide channel feedback.

Example components of base station 490 include reference signal generator 401, reference signal transmitter 402, feedback receiver 403, feedback transformer 404, and signal adjuster 405. Example components of mobile device 410 include sample receiver 411, sample grid builder 413, subsampler 414, subsample compressor 415, subsample transformer 416, and feedback transmitter 417.

Sample grid builder 413 can build a sample grid and to identify channel state samples, in accordance with one or more embodiments. Subsampler 414 can then proceed to perform subsampling at sample points identified with respect to the sample grid, e.g., sampler 414 can measure the strength of radio frequency signals at various different frequencies identified by the sample points. The resulting sample data can optionally be compressed at subsample compressor 415, and can optionally be transformed at subsample transformer 416. Sample data transmitter 417 can transmit the resulting sample data to base station 490 as feedback 314. The sample data can be received at feedback receiver 403, and feedback transformer 404 can optionally transform feedback 314. Signal adjuster 405 can then make use of the feedback 314, e.g., by adjusting signal transmissions and/or receiver settings at base station 490.

Figure 5:
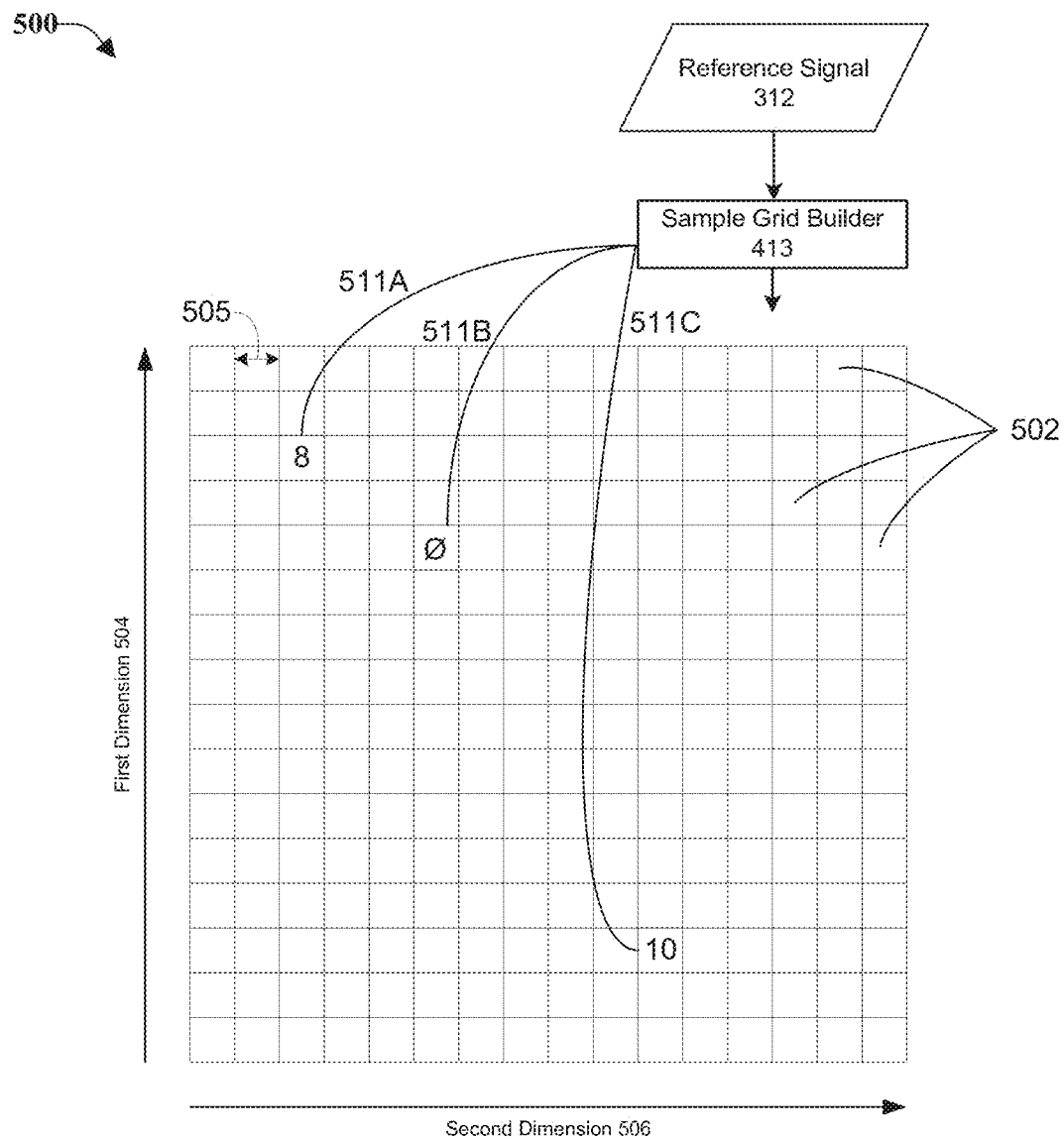
FIG. 5 is a diagram illustrating an example grid with a first dimension and a second dimension, and samples identified thereon, in accordance with various aspects and implementations of the subject disclosure.

FIG. 5 is a non-limiting, example diagram illustrating an example grid 500 having sample points 502 with a first dimension 504 and a second dimension 506, and samples identified thereon, in accordance with various aspects and implementations of the subject disclosure. Repetitive description of like elements employed in other embodiments described herein is omitted for sake of brevity. It should be noted that sample points 502 refers, in this discussion, to up to all of the intersection points of first dimension 504 and second dimension 506, not only the three points labeled.

As depicted, reference signal 312 can be processed by sample grid builder 413 to generate grid 500 composed of sample points 502. Grid 500 can have a first dimension 504 and a second dimension 506, and a granularity defined by a sampling interval 505. Furthermore, in some embodiments, the first dimension 504 can be time and the second dimension 506 can be frequency. In some embodiments, the first dimension 504 can be delay and the second dimension 506 can be Doppler. Sample points 502, and resulting sample values at the sample points 502, can be transformed by subsample transformer 417 and feedback transformer 404, respectively, as needed at the mobile device 410 or at the base station 490, e.g., from the time-frequency domain to the delay-Doppler domain, and vice versa. Other domains can also be used in some embodiments.

In one or more embodiments, grid 500 can represent a sample of radio frequency signal strength for an intersection of the first and second dimensions, e.g., at block 511A positioned at first dimension 506 frequency and second dimension 506 time. For example, reference signal 312 can be sampled by sample receiver 411, and respective radio frequency signal strengths can be measured for sample points 511A-C.

In other embodiments, first dimension 504 can be delay and second dimension 506 can be Doppler. Sample points 502, and resulting sample values at the sample points 502, can be transformed as needed at the mobile device 410 or at the base station 490, e.g., from the time-frequency domain to the delay-Doppler domain, and vice versa. Other domains can also be used in some embodiments.

The subsampled grid 500 and sample points 511A-C can be generated and used at a mobile device 410 such as described with FIG. 4 above. For example, mobile device 410 can use subsampled grid 500 and sample points 511A-C to determine which radio frequencies to sample, e.g., by a sampler 414. Measured sample values at the sample points 511A-C are referred to in some additional examples below as feedback 314.

Figure 6:
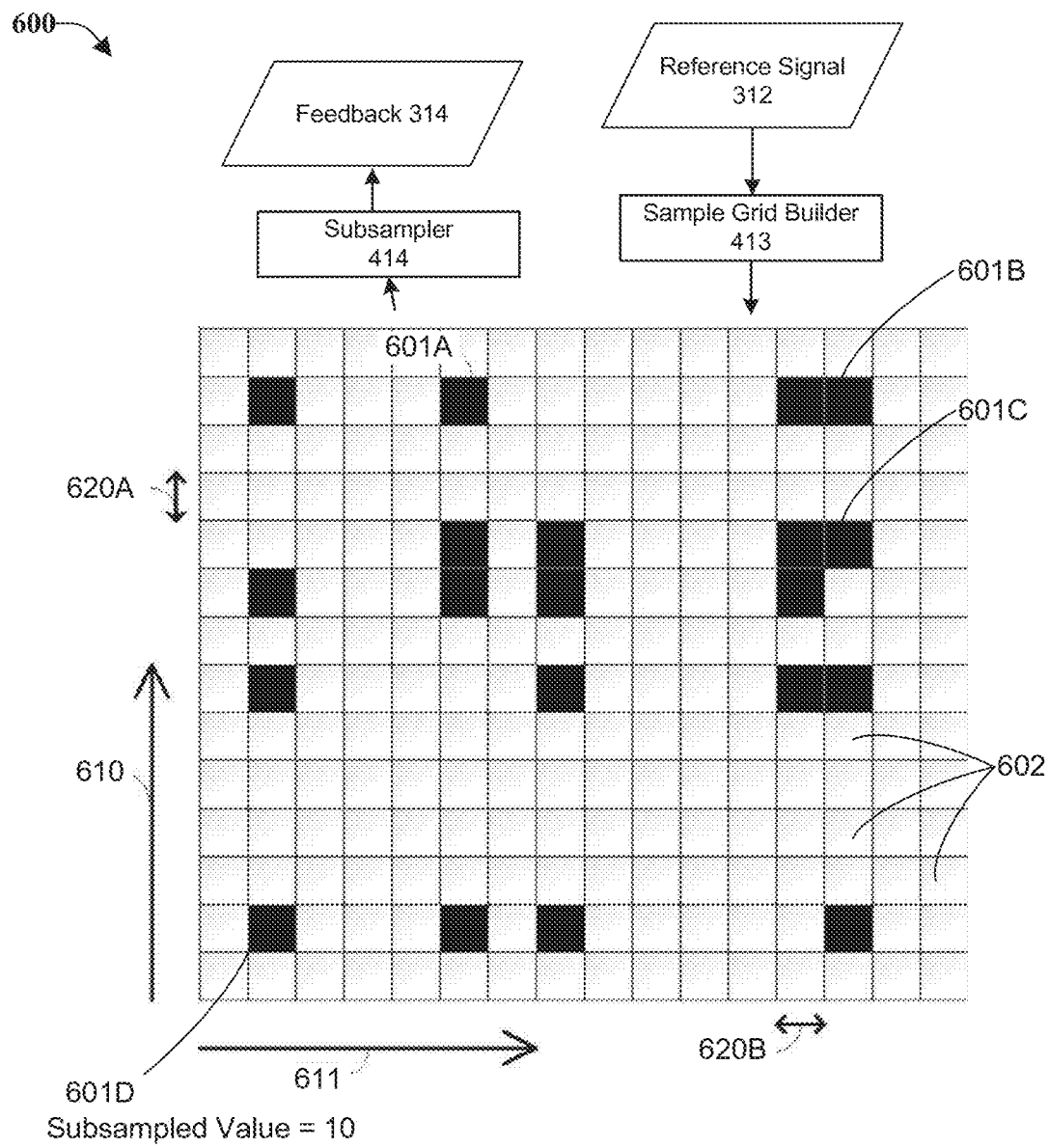
FIG. 6 is a diagram illustrating another example grid with a first dimension and a second dimension, and irregularly placed subsamples identified thereon, in accordance with various aspects and implementations of the subject disclosure.

FIG. 6 is a diagram illustrating another example grid 600 with first dimension 610 and second dimension 611, and irregularly selected subsamples 601 identified thereon, in accordance with various aspects and implementations of the subject disclosure. Repetitive description of like elements employed in other embodiments described herein is omitted for sake of brevity.

Providing a different view of sampled reference signal 312, grid 600, generated by sample grid builder 413, also includes sample points 602, reflecting a sample value at the intersection of first dimension 610 and second dimension 611, e.g., sample values, when accessed by base station 490 can facilitate, e.g., by signal adjuster 405, signal adjustments that can improve signal characteristics such as signal strength and signal quality, and to mitigate potential problems, such as interference.

Sampling intervals 620A-B are depicted for first dimension 610 and second dimension 611 respectively, e.g., signal strength at a time/frequency respectively. In one or more embodiments, subsamples 601A-D (and the other black points depicted) can be selected from sample points 602 resulting is a subset of the collected samples of reference signal 312. It should be noted that, in contrast to regular sampling or other approaches (e.g., where zero values and non-zero values are reported), one or more embodiments can select a subset of sampled values and can provide feedback based on the subsamples to signal adjuster 405 for signal adjustments. Stated differently, in accordance with one or more embodiments described below, different approaches can be taken to select subsamples 601A-D such that, when incorporated in feedback 314 and communicated to base station 490, signal adjuster 405 receives enough useful information to perform beneficial adjustments.

In different embodiments, the subsampling described herein can provide a range of information, from facilitating a transformation of the subsampled values (e.g., by feedback transformer 404) into a reproduction of the samples of grid 600, to a reproduction of a targeted, relevant subset of sampled values of grid 600, e.g., providing one or more benefits that outweigh the providing of less information by embodiments. It should be noted that, in different examples, the implementations of one or more embodiments can be based on weighing detrimental effects from the providing of less information against the beneficial reductions in feedback overhead, as described above, e.g., not every part of grid 600 contains useful information, and overhead can be reduced by selecting and reporting the sampled values that matter for particular goals. To provide additional details regarding one or more embodiments, different approaches are described below. It would be appreciated by one having skill in the relevant art(s), given the description herein, that aspects of some embodiments can be beneficially combined to address certain circumstances, and some embodiments described below are alternative approaches to performing different functions.

In an example, in one or more embodiments, a subsampler 414 of a UE can be configured only subsample values that are in accordance with one or more criteria. For example, only samples with a signal strength above a threshold may be subsampled and reported to base station 490. For an example goal that has adjuster 405 only analyzing and adjusting signals with comparatively high strength (e.g., these signals being more likely to cause interference, in some circumstances), this approach provides these signals and saves overhead by omitting other, less relevant values. It should be noted that this subsampling approach can be termed irregular subsampling, because subsamples are collected, not based on a regular interval (e.g., of time or frequency), rather they are irregularly collected based on sample values, e.g., resulting in an irregular subsampled grid, such as grid 600 having subsamples 601A-D.

In an example of this approach, with a number of total sample points M, given this irregular subsampling, mobile device 410 only reports L<M values above a certain threshold. In another detail of this approach, because values are subsampled at irregular (e.g., unpredictable) intervals, the period of subsampling for the subsamples cannot be derived by base station 490, as opposed to some types of regular sampling approaches. To replace this period, one or more embodiments can provide to signal adjuster 405, the L values selected and the grid 600 coordinates of these values. As described with additional or alternative embodiments below, different approaches can be used, both to select subsamples and to supply coordinate information to base station 490.

One approach used by one or more embodiments to provide this coordinate information, provides two vectors (e.g., $x_{dim1}$ and $x_{dim2}$) with each subsampled value reported, e.g., each vector only including 0 or 1, with lengths of the two vectors respectively encoding the respective spans of first dimension 610 and second dimension 611. For example, the subsampled value (e.g., 10) for sampled point 601D of grid 600 can be encoded as $x_{dim1}$=[0 1 0 0 0 0 0 0 0 0 0 0 0 0] and $x_{dim2}$=[0 1 0 0 0 0 0 0 0 0 0 0 0 0].

In an alternative approach to the approach described above, instead of reporting dimension vectors along with subsampled values, grid 600 can be collapsed into one vector, and combinatorial values of this vector can be generated, e.g., by subsample transformer 416. These combinatorial values and the subsampled values can be communicated to base station 490, where, for example, feedback transformer 404 can decode the communication to determine the coordinates of the subsampled values.

In a variation of the above approaches, in another embodiment, instead of subsampling and reporting all sampled values above a threshold, e.g., L, or M values according to the embodiments herein, the UE can be configured to report the Q best values, e.g., a top number of values based on another criteria.

In another variation of the above approaches, instead of reporting all values above a threshold, e.g., L, or M values according to the embodiments herein, and instead of reporting the Q best values, in order to set a maximum overhead for the feedback provided by mobile device 410, a limit can be placed, for example, on the total number of values that the UE reports, e.g., the number of values, the size of the values, or other similar measurement. For example, while mobile device 410 can subsample grid 600 using an approach, mobile device 410 only reports as many values as it can be encoded without exceeding a set number of bits (A).

In a variation that combined the Q-best approach and the A-maximum bits approach, a single value for Q (or a single value for A) can be configured and applied to both first dimension 610 and second dimension 611. Alternatively, different values of Q (or different values of A) can be configured per dimension.

In yet another variation of the example embodiments described above, instead of subsampling or reporting all sampled values above a threshold, e.g. L or M values according to the embodiments herein, and instead of reporting a given number of values according to a fixed overhead of A bits, mobile device 410 can encode values according to their relative location in the original grid. In an example of this additional approach, out of the M values in grid 600, L' values can be chosen such that their power exceeds a threshold T', where T'>T, and L-L' are chosen from the rest of the M values, resulting in an L number of feedback values chosen non-uniformly (e.g., irregularly subsampled) across grid 600.

In yet another embodiment, instead of non-uniformly choosing an L number of values above a threshold, mobile device 410 can be configured to use an approach that combines the L values above a threshold approach with the maximum feedback overhead limited to A. For example, for all the sample values that exceed certain threshold T', A bits can be allocated, and those sample values below are allocated A' bits, e.g., allocating overhead based on applied criteria.

The following three example embodiments use approaches where coordinates of reported values can be encoded along with the values, e.g., by using one or more of vectors and combinatorial indexes. In an embodiment that is a variation of the two-vector example approach described above, example vectors $x_{dim1}$ and $x_{dim2}$ are not encoded as sequences of only ones and zeros. In this example, coordinates of subsampled values can be indicated by the UE using a combinatorial index r. In an example of this approach, X can be a Boolean matrix corresponding to the points on the subsampled grid, such that $X_{i,j}$ matrix values that equal 1 correspond to a location (i, j) where a subsample has been collected, with a zero value for $X_{i,j}$ indicating that no subsample was collected from the (i, j) coordinates. In further details of this example, x can be equal to a vector obtained by vectorizing the matrix X, e.g., x=vec(X). With this, the UE can signal a number of values in both matrix X (e.g., corresponding vector x), and a combinatorial index r. For this example, let $\{k_i\}_{i=0}^{N-1}$ be indicative of the indices of the points on the subsampled grid in the vectorized location vector x with $k_i<k_{i+1}$ and $1 \le k_i \le X_j$. Based on this, in this example, $$r = \sum_{l=0}^{X_j-1} \binom{Y_j - k_l}{X_j - i}$$

where $Y_j$ is the size of the vector x and $$\binom{a}{b} = \begin{cases} \binom{a}{b} & a \ge b \\ 0 & a < b \end{cases}$$

is the extended binomial coefficient. In this approach, r and N can uniquely represent the coordinates of the reported, subsampled values such that the gNB can first obtain x and then subsequently obtain X from the r and N values communicated by the UE as feedback.

In a variation of this combinatorial index approach, in another example, matrix X can correspond to above described example matrix of the locations of subsampled values, e.g., with as $X_{i,j}$ being equal to 1 when there is a value to report, and no value reported when $X_{i,j}=0$. Based on this, values of each row (column) of the matrix X can be represented by a combinatorial index $r_j$, with $X_j$ being, for example, the number of reported values in the corresponding row (column). Further, $$\{k_i^j\}_{i=0}^{X_j-1}$$

can indicate the indices of the points on the subsampled grid in the vectorized location vector x with $k_i^j<k_{i+1}^j$ and $1 \le k_i^j \le X_j$. Based on this, in this example, $$r_j = \sum_{l=0}^{X_j-1} \binom{Y_j - k_l^j}{X_j - i}$$

where $Y_j$ is the size of the row (column) of the matrix X and $$\binom{a}{b} = \begin{cases} \binom{a}{b} & a \ge b \\ 0 & a < b \end{cases}$$

is the extended binomial coefficient. Accordingly, in this example, the UE can provide feedback by communicating the generated indices $r_j$, $j=1,2,3, \ldots, Y_j$, where $Y_j$ is the number of rows (columns) in the matrix X.

In another variation of the two combinatorial index approaches described above, another example can utilize the above-described matrix X of the locations of subsampled values, e.g., with as $X_{i,j}$ being equal 1 when there is a value to report, and no value reported when $X_{i,k}=0$. In this example, where $X_j$ corresponds to the number of reported values in the corresponding row (column), $\{k_i^j\}_{i=0}^{Kj-1}$ can indicate the indices of the points on the subsampled grid in the vectorized location vector x, with $k_i^j<k_{i+1}^j$ and $1 \le k_i^j \le X_j$. Based on this, in this example, $$r_j = \sum_{l=0}^{X_j-1} \binom{Y_j - k_l^j}{X_j - i}$$

where $Y_j$ is the size of the row (column) of the matrix X and $$\binom{a}{b} = \begin{cases} \binom{a}{b} & a \ge b \\ 0 & a < b \end{cases}$$

is the extended binomial coefficient. The UE signals the indices $r_{i,j}=1,2,3, \ldots, Y_j$, where $Y_j$ is the number of rows (columns) in the matrix X. Accordingly, in this example, the UE can provide feedback by communicating the generated indices $r_j$,$j=1,2,3, \ldots, Y_j$, where $Y_j$ is the number of rows (columns) in the matrix X.

In another embodiment, described below, a large proportion of values in the original grid can either be zero or a minimal level above zero, this being termed, in some circumstances a sparse representation of the sampled radio frequency signal power. One having skill in the relevant art(s), given the description herein, will appreciate that the sparsity of the representation can be measured using different approaches, e.g., comparing the proportion of proportion of values in the original grid that are either zero or a minimal level above zero to an implementation specific, selected density criterion.

Assuming a sparse representation of values in the original grid is determined by one or more embodiments, and, in an example where the number or location of points selected to be communicated to base station 490 as feedback is potentially unknown, there may be no need to compute all the possible values in the original grid, e.g., computing so as to choose the L values above a certain threshold, as described in examples above With a sparse representation of values in this example original grid, in the case where the number or location of points used for the feedback is unknown, instead of computing all the possible values in the original grid, and then choosing L values above a certain threshold, a compressive sampling approach can be used.

One approach to compressive sampling that can be used by one or more embodiments lets x be a representation of the signal in the original grid, where x is assumed to be sparse, e.g. L values of x are above a certain threshold (e.g., non-zero) and Φ be the measurement matrix, then y=Φ x. y is the measurement vector, such that the number of elements of y is far less the number of elements in the original signal x, and the measurement matrix Φ is a fat matrix. Similar to the examples above, this measurement vector can be communicated to a base station as feedback, e.g., in a channel state report, as described above.

Recovering (e.g., reconstructing) the irregularly sampled values (e.g., x) at the base station from the measurement vector (e.g., observation elements y) can be, in one or more embodiments, a sparse reconstruction problem of estimating an unknown sparse vector x from an observed set of measurements y, or in other words finding out which L columns of Φ were used to generate y. One method is based on orthogonal matching pursuit where the vector y is projected onto the span of j columns of the matrix Φ, and the residual from the projection is computed, and then the column that best approximates the residual is found.

Figure 7:
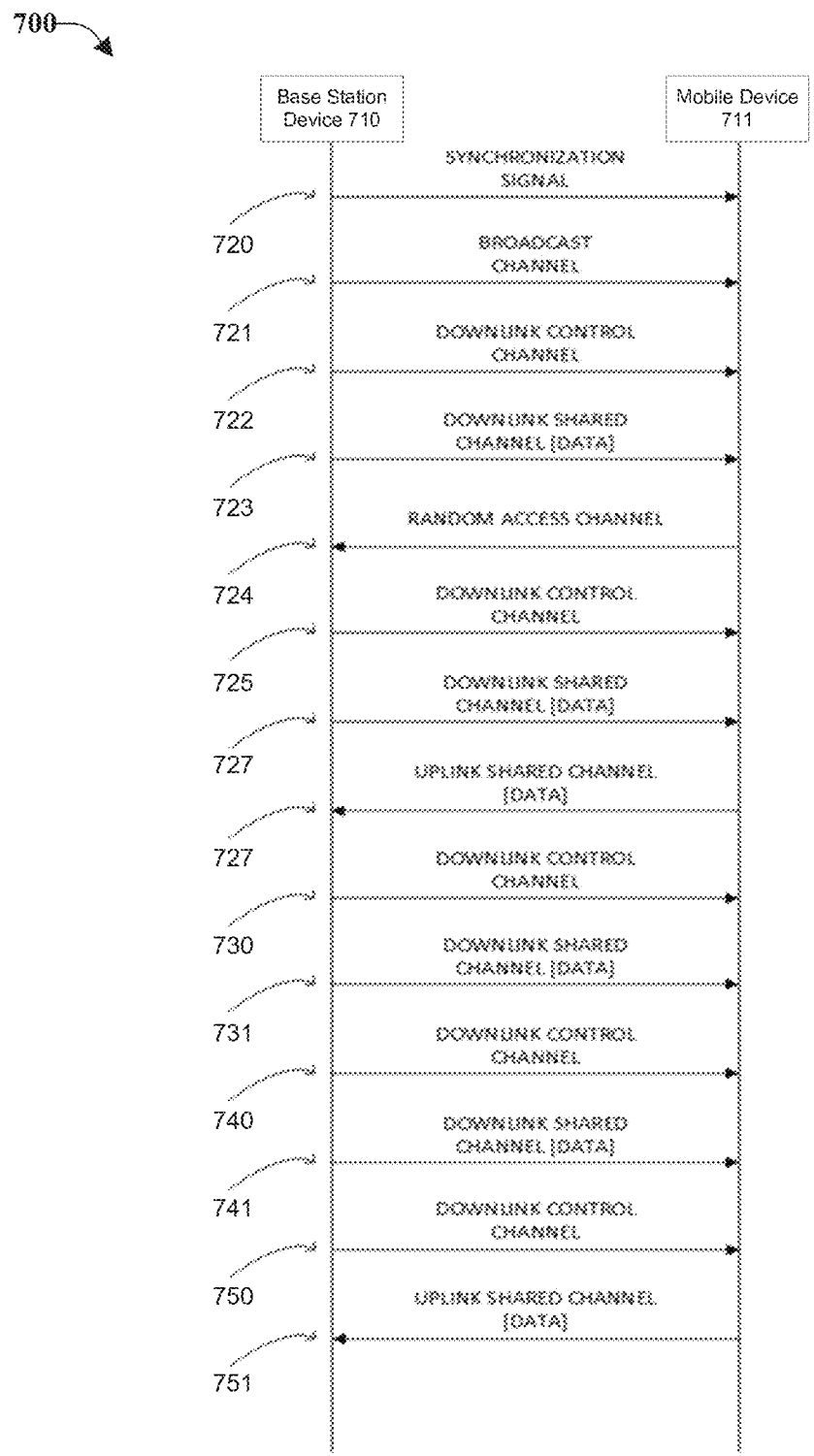
FIG. 7 illustrates example communications between a base station and a mobile device, in accordance with various aspects and implementations of the subject disclosure.

FIG. 7 illustrates example block diagram 700 representing mobile device 711 performing a cell search procedure by decoding a synchronization signal 720 from a base station device, and after decoding the synchronization signal 720, acquiring the master system information carried on the physical broadcast channel (PBCH) 721, in accordance with one or more embodiments. Repetitive description of like elements employed in other embodiments described herein is omitted for sake of brevity.

In one or more embodiments, master system information can configure mobile device 711 for reception of remaining system information (RMSI) transmitted by a physical downlink shared channel (PDSCH) 723 which can be scheduled by a physical downlink control channel transmission (PD-CCH) 721. The RMSI then can configure mobile device 711 for a random access procedure whereby mobile device 711 can send a physical random access channel (PRACH) 724 to base station device 710 (message 1). Base station device 710 can respond via a random access response (RAR) carried by a physical downlink shared channel (PDSCH) 726 scheduled by a physical downlink control channel transmission (PDCCH) 725 (message 2). Finally, the mobile device 711 can send message 3 on a physical uplink shared channel (PUSCH) 727 scheduled by message 2 in 726. If necessary, contention resolution can be performed by the network by transmitting message 4 from base station device 710 to the intended mobile device 711 informing other contending UEs of the contention. Message 4 can be scheduled by PDCCH 730 and transmitted by PDSCH 731. After successful contention resolution, mobile device 711 can be provided with a dedicated radio resource control (RRC) configuration in PDSCH transmission 741 which can be scheduled by PDCCH 740. At this point, base station device 710 and mobile device 711 can have successfully established a dedicated communication link. Subsequently, or as part of the initial RRC configuration in 741, mobile device 711 may be configured according to the embodiments herein.

In one embodiment, various aspects and embodiments of the subject disclosure, such as but not limited to the span and the number of samples per dimension $N_{dim1}$ and $N_{dim2}$, are configured at mobile device 711 by base station device 710. Base station device 710 can use prior feedback of measurements by mobile device 711, e.g., sent to base station device 710 on a physical uplink shared channel (PUSCH) or a physical uplink control channel (PUCCH), to determine feasible parameter sets when configuring mobile device 711. Base station device 710 may continuously adapt said parameters based on feedback from the mobile device 711.

In another embodiment, mobile device 711 can determine various aspects and embodiments of the subject disclosure, such as but not limited to the span and the number of samples per dimension N¬¬dim1 and Ndim2, autonomously. When mobile device 711 reports the autonomously chosen parameter set to base station device 710, the station may either accept or disregard some or all of the parameters recommended by mobile device 711.

In one embodiment, various aspects and embodiments of the subject disclosure are configured at mobile device 711 using the radio resource control (RRC) protocol. In another embodiment, various aspects and embodiments of the subject disclosure are first configured by RRC. Afterwards, base station device 710 may change some parameters using the multiple access control (MAC) protocol. For example, by sending MAC control elements (CEs) on the physical downlink shared channel (PDSCH), mobile device 711 may dynamically adapt some or all parameters of the RRC configuration.

In yet another embodiment, mobile device 711 is first configured by RRC. Said RRC configuration concerning various aspects and embodiments of the subject disclosure can determine mobile device 711 behavior in regard to some bits in the downlink control information (DCI) sent on a physical downlink control channel (PDCCH). For example, the RRC configuration may configure multiple parameter sets for various aspects and embodiments of the subject disclosure, such as but not limited to the span and the number of samples per dimension $N_{dim1}$ and $N_{dim2}$. By sending DCI on the PDCCH base station device 710 can then select one of said parameter sets to be used by the mobile device 711.

In one embodiment, reporting by the mobile device 711 to base station device 710 according to various aspects and embodiments of the subject disclosure is by sending uplink control information (UCI) on either a physical uplink shared channel (PUSCH) or a physical uplink control channel (PUCCH) transmission.

In another embodiment, reporting by the mobile device 711 to base station device 710 according to various aspects and embodiments of the subject disclosure is by sending MAC CEs on a physical uplink shared channel (PUSCH).

When mobile device 711 reports to base station device 710 according to various aspects and embodiments of the subject disclosure, in one embodiment, it may include a header with the reported parameters. For example, when mobile device 711 reports the one of L, M values according to the embodiments herein, e.g., using one or more vectors xdim1 and xdim2 or one or more combinatorial indices r1 and r2, said header may inform base station device 710 about the corresponding span and the number of samples per dimension $N_{dim1}$ and $N_{dim2}$.

Using one or more embodiments described above can result in benefits that include, but are not limited to, beneficial use in FDD systems that exploit reciprocity to improve the CSI feedback from mobile device 711 to the base station, reducing overhead and improving the usefulness of feedback in 5G MIMO systems and beyond, improving backward compatibility to existing orthogonal frequency division multiple access systems, such as the 3GPP 5G NR system, and facilitating the control of the overhead of the CSI feedback by exploiting the sparsity and invariance in the delay doppler domain.

Figure 8:
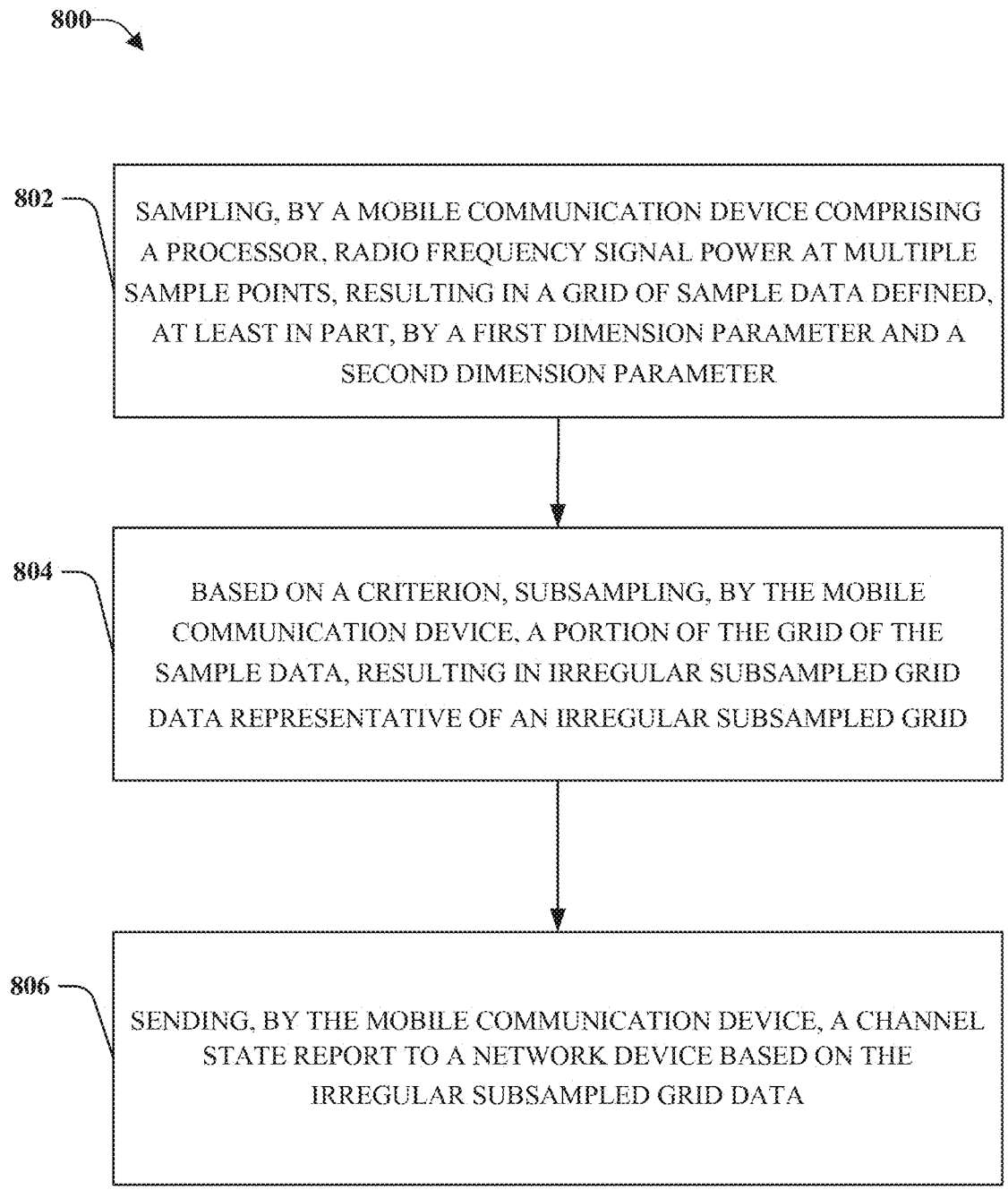
FIG. 8 depicts a flow diagram representing example operations of UE device, in accordance with various aspects and implementations of the subject disclosure.

FIG. 8 depicts a flow diagram representing example method 800, in accordance with various aspects and implementations of the subject disclosure. It should be noted that, one or more aspects, (e.g., implemented in a machine-readable storage medium, comprising executable instructions that, when executed by a processor, facilitate performance of operations) can be represented in FIG. 7.

At 802, method 800 can comprise sampling, by a mobile communication device comprising a processor, radio frequency signal power at multiple sample points, resulting in a grid of sample data defined, at least in part, by a first dimension parameter and a second dimension parameter. For example, in one or more embodiments, a method can comprise sampling, by a mobile communication device (e.g., UE 110) comprising a processor (e.g., mobile handset 900 comprises processor 902), radio frequency signal power at multiple sample points (e.g., first dimension 610 and second dimension 611 of grid 600), resulting in a grid of sample data defined, at least in part, by a first dimension parameter and a second dimension parameter.

At 804, method 800 can comprise based on a criterion, subsampling, by the mobile communication device, a portion of the grid of the sample data, resulting in irregular subsampled grid data representative of an irregular subsampled grid. For example, in one or more embodiments, a method can comprise For example, in one or more embodiments, a method can comprise based on a criterion, subsampling (e.g., subsampler 414 collecting subsamples 601A-D), by the mobile communication device, a portion of the grid of the sample data, resulting in irregular subsampled grid data representative of an irregular subsampled grid (e.g., grid 600 and subsamples 601A-D).

At 806, method 800 can comprise sending, by the mobile communication device, a channel state report to a network device based on the irregular subsampled grid data. For example, in one or more embodiments, a method can comprise sending, by the mobile communication device, a channel state report (e.g., feedback 314 generated by subsample transformer and transmitted by feedback transmitter 417) to a network device (e.g., base station 490) based on the irregular subsampled grid data.

Figure 9:
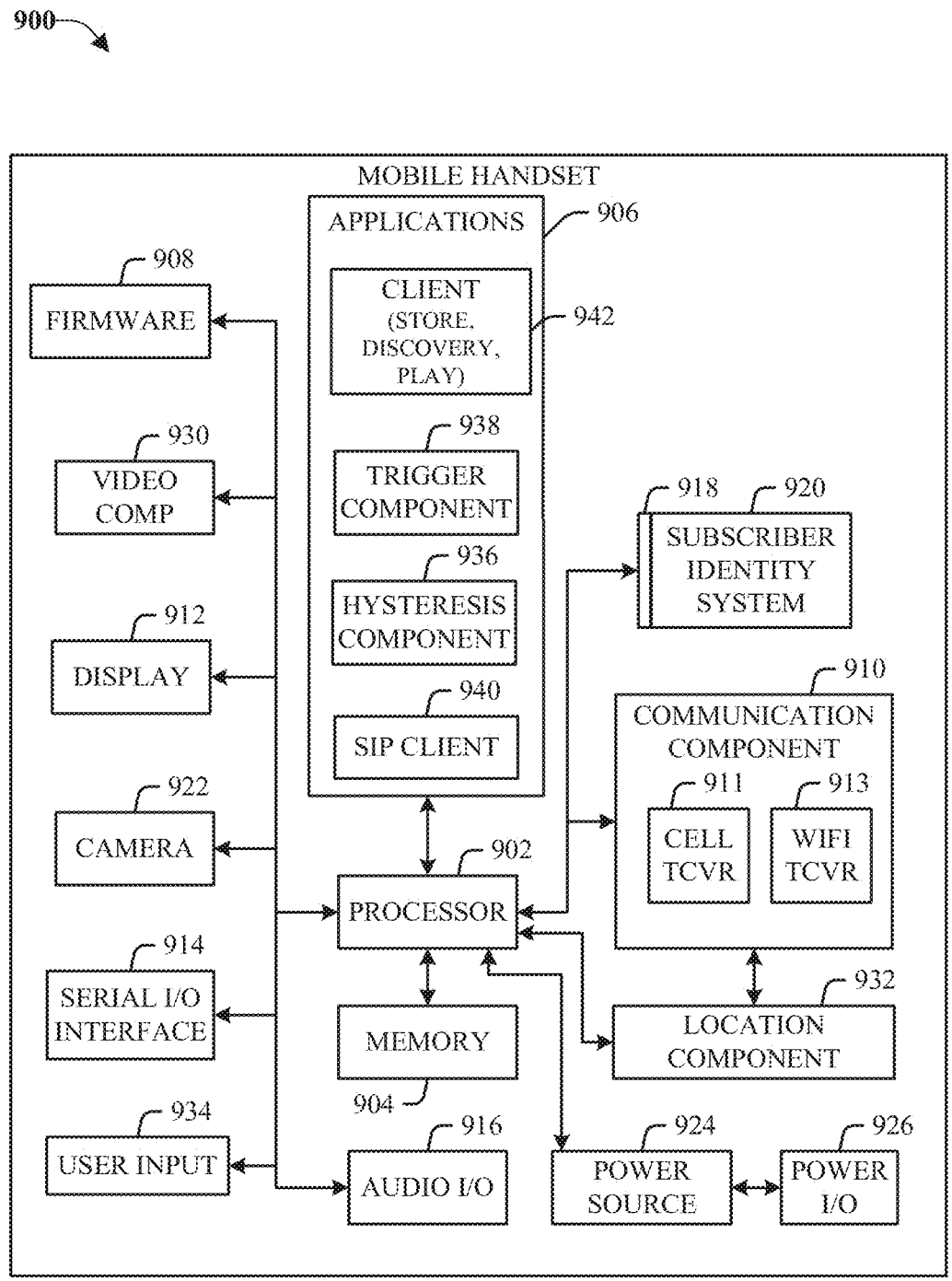
FIG. 9 is a block diagram of an example mobile handset operable to engage in a system architecture that facilitates wireless communications according to one or more embodiments described herein.

FIG. 9 includes is an example block diagram of an example mobile handset 900 operable to engage in a system architecture that facilitates wireless communications according to one or more embodiments described herein. Mobile handset 900 is one example mobile device 110 illustrated in FIG. 1. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
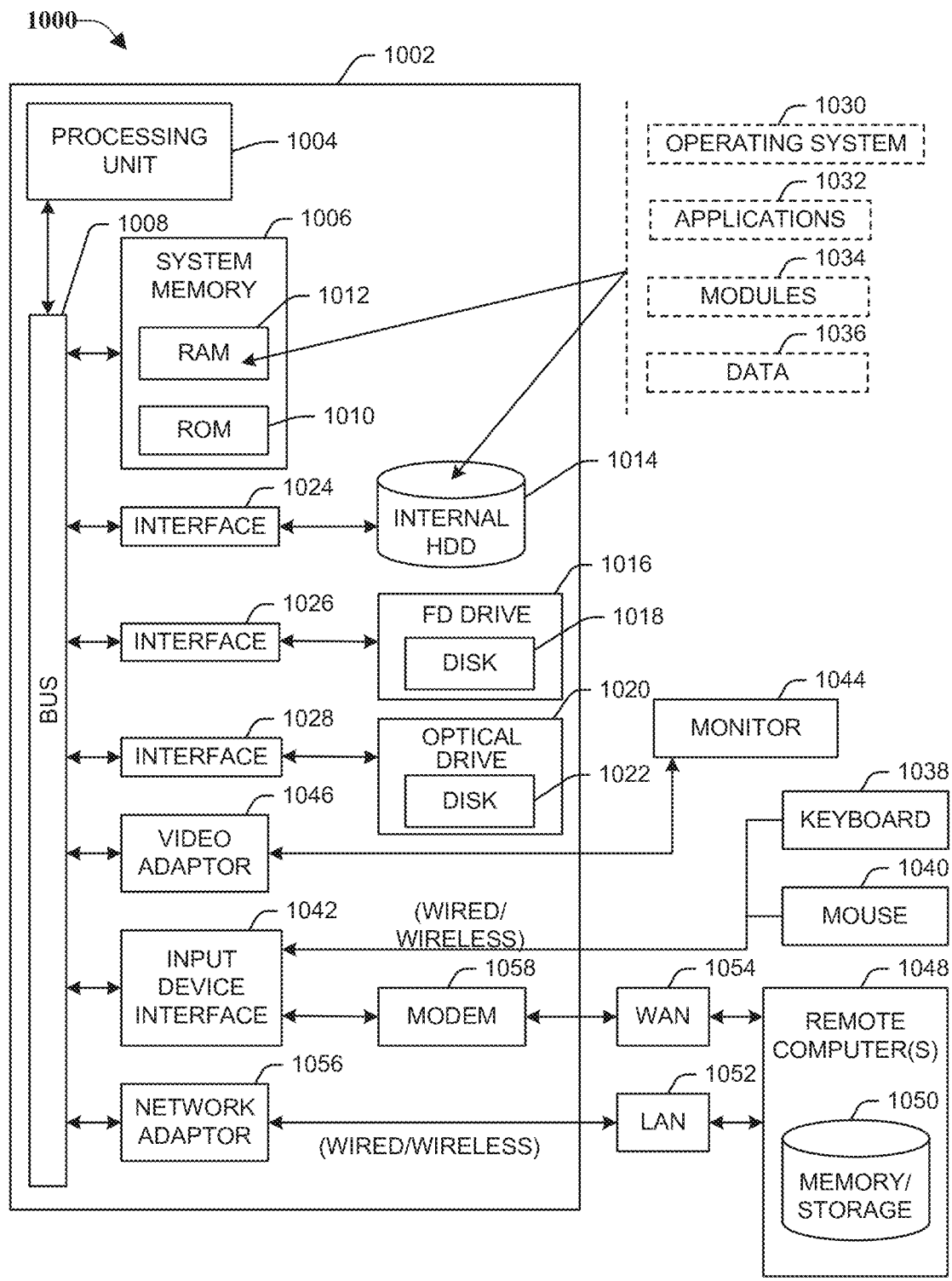
FIG. 10 illustrates a suitable computing environment in which the various aspects of this disclosure can be implemented, in accordance with various aspects and implementations of the subject disclosure.

In order to provide additional context for various embodiments described herein, FIG. 10 and the following discussion are intended to provide a general description of a suitable computing environment 1000 in which the various embodiments of the embodiment described herein can be implemented. The computer 1002 can implement, for example, network device 150 of FIG. 1.

While the embodiments have been described above in the general context of computer-executable instructions that can run on one or more computers, those skilled in the art will recognize that the embodiments can be also implemented in combination with other program modules and/or as a combination of hardware and software. Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

FIG. 10 depicts an example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), a magnetic floppy disk (MFD) drive 1016, (e.g., to read from or write to a removable diskette 1018) and an optical disk drive 1020, (e.g., reading a CD-ROM disk 1022 or, to read from or write to other high capacity optical media such as the DVD). While the internal HDD 1014 is illustrated as located within the computer 1002, the internal HDD 1014 can also be configured for external use in a suitable chassis (not shown). The HDD 1014, MFD drive 1016 and optical disk drive 1020 can be connected to the system bus 1008 by an HDD interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1094 serial port, a game port, a USB port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter can have been disclosed with respect to only one of several implementations, such feature can be combined with one or more other features of the other implementations as can be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    sampling, by a mobile communication device comprising a processor, radio frequency signal power at multiple sample points, resulting in a grid of sample data defined, at least in part, by a first dimension parameter and a second dimension parameter, the sampling resulting in a sampled radio frequency signal power;
    based on a criterion, subsampling, by the mobile communication device, a portion of the grid of the sample data, resulting in irregular subsampled grid data representative of an irregular subsampled grid; and
    sending, by the mobile communication device, a channel state report to a network device based on the irregular subsampled grid data.

2. The method of claim 1, wherein the subsampling of the portion of the grid of the sample data comprises the subsampling of the portion of the grid of the sample data based on an energy of the portion of the grid of the sample data, and a threshold.

3. The method of claim 2, wherein the subsampling of the portion of the grid of the sample data based on the energy of the portion of the grid of the sample data, and the threshold comprises the subsampling of the portion of the grid of the sample data based on the energy being determined to have exceeded the threshold.

4. The method of claim 1, wherein the subsampling of the portion of the grid of the sample data comprises the subsampling of the portion of the grid of the sample data based on respective locations in the grid of the sample data.

5. The method of claim 1, wherein the first dimension parameter comprises a time dimension parameter and the second dimension parameter comprises a frequency dimension parameter.

6. The method of claim 1, wherein the first dimension parameter comprises a delay dimension parameter and the second dimension parameter comprises a doppler dimension parameter.

7. The method of claim 1, wherein the sampling of the radio frequency signal power at the multiple sample points comprises the sampling of the radio frequency signal power of a reference signal received from the network device.

8. The method of claim 1, wherein the sending the channel state report based on the irregular subsampled grid data comprises sending the irregular subsampled grid data.

9. The method of claim 1, wherein the subsampling the portion of the grid of the sample data comprises subsampling the portion of the grid of the sample data based on a combinatorial index of the grid.

10. The method of claim 1, wherein the subsampling the portion of the grid of the sample data comprises subsampling the portion of the grid of the sample data based on a combinatorial index based on the first dimensional parameter and the second dimensional parameter.

11. The method of claim 1, wherein the subsampling the portion of the grid of the sample data comprises subsampling the portion of the grid of the sample data based on combinatorial indices of the grid of the sample data, and wherein a first number of the combinatorial indices corresponds to a second number of rows in the grid of the sample data or a third number of columns in the grid of the sample data.

12. The method of claim 1, wherein the grid of sample data sparsely represents the sampled radio frequency signal power according to a defined density criterion, and wherein the irregular subsampled grid data is recoverable by the network device from the channel state report by compressive sampling.

13. The method of claim 1, wherein the sending of the channel state report to the network device comprises the sending of the channel state report until a fixed feedback overhead value has been determined to have been exceeded, and wherein the feedback overhead value comprises at least one of a first total number of values sent, a second total of values above a threshold sent, or a third total bit size of the first total number of values sent.

14. A system, comprising:
a processor; and
a memory that stores executable instructions that, when executed by the processor, facilitate performance of operations, comprising:
communicating, via a transceiver, a reference signal to a device;
based on a criterion, receiving, via the transceiver, a channel state report from the device that is based on an irregularly subsampled portion of the reference signal; and
based on the channel state report, adjusting a communication parameter of the transceiver.

15. The system of claim 14, wherein the irregularly subsampled portion of the reference signal based on the criterion comprises the irregularly subsampled portion of the reference signal based on an energy measure, which was measured by the device, of a radio frequency signal power the reference signal, and a threshold applicable to the energy measure.

16. The system of claim 15, wherein the irregularly subsampled portion of the reference signal based on the energy measure and the threshold comprises the irregularly subsampled portion of the reference signal based on the energy measure being determined to exceed the threshold.

17. The system of claim 14, wherein an antenna is coupled to the transceiver, wherein the communication parameter comprises a beamforming parameter, and wherein the adjusting the communication parameter is based on increasing signal strength of signals transmitted via the antenna to the device.

18. A non-transitory machine-readable medium, comprising executable instructions that, when executed by a processor, facilitate performance of operations, comprising:
irregularly sampling a time-frequency grid generated based on a reference signal received from an array of multiple input multiple output antennas, resulting in irregular samples, wherein the irregular sampling is based on analysis of costs of reducing feedback to the array of multiple input multiple output antennas compared to benefits of a reduction in overhead of the feedback; and
facilitating communicating a channel status report to the array of multiple input multiple output antennas based on the irregular samples and a result of the analysis.

19. The non-transitory machine-readable medium of claim 18, wherein the operations further comprise, receiving a signal from the array of multiple input multiple output antennas, and wherein the signal was adjusted by the array of multiple input multiple output antennas based on the channel status report.

20. The non-transitory machine-readable medium of claim 18, wherein the costs of reducing the feedback comprise a signal interference between antennas of the array of multiple input multiple output antennas.

* * * * *